Jan. 16, 1973   J. M. SNYDER ET AL   3,711,349
TAPE SEAMING METHOD
Filed Jan. 28, 1970

INVENTOR.
JOHN M. SNYDER
JAMES J. O'NEILL
BY
Edward Halle
ATTORNEY.

United States Patent Office 3,711,349
Patented Jan. 16, 1973

3,711,349
TAPE SEAMING METHOD
John M. Snyder, New York, and James J. O'Neill, Baldwin, N.Y., assignors to Commercial Affiliates, Inc., New York, N.Y.
Filed Jan. 28, 1970, Ser. No. 6,528
Int. Cl. B65h 69/02
U.S. Cl. 156—157
14 Claims

ABSTRACT OF THE DISCLOSURE

A tape seam for seaming two materials in edge abutting relationship in which the seam and the method for making the seam contemplates the use of an adhesive tape on which a first work piece, such as a piece of carpeting, or the like, is placed, and then rendering the balance of the adhesive on the face of the tape non-tacky for the interval of time required to place the second work piece in edge abutting relationship against the first work piece. After placing the two work pieces together in this manner, the adhesive on the tape under the second work piece becomes tacky again, finishing the seam. The tape itself may be double faced with adhesive so that it may hold the work pieces together and also hold the seam to a holding surface such as a ceiling, wall or floor.

---

This invention relates to seaming work pieces together, and in particular, work pieces which are seamed together and held over a holding surface. An example of such an arrangement would be a seamed carpet held to a floor or seamed material held to a wall or a ceiling.

The seaming is accomplished by means of an adhesive tape, either single or double faced, preferably double faced with adhesive. The adhesive tape is first laid on the holding surface with the rear surface of the tape being adhered to the holding surface by means of the adhesive. Then a first work piece is placed on the adhesive with an edge of the first work piece arranged medially or approximately half way across the tape, leaving room for a second work piece to run with an edge along the other half of the tape.

In the past, difficulty has been encountered in aligning the second work piece in edge abutting relationship with the first work piece because of the tackiness of the uncovered adhesive on the second half of the tape.

It is, therefore, an object of this invention to provide a method and a seam construction in which the second work piece can be placed in edge abutting relationship to the first work piece without undue interference from the tackiness of the adhesive.

It is a further object of this invention to provide a means to temporarily reduce the tackiness of the adhesive of the seam during the time when the second work piece is being aligned against the first work piece.

Figure 1:
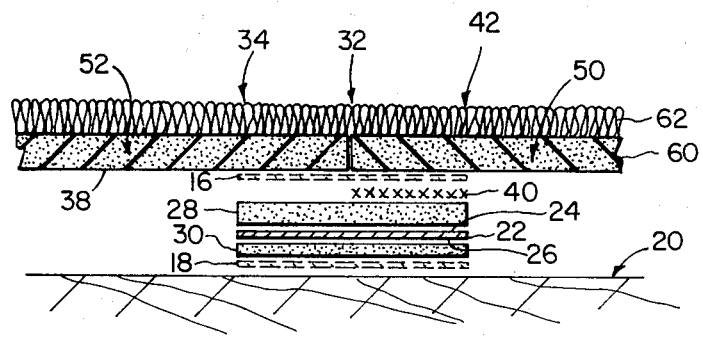
Figure 2:
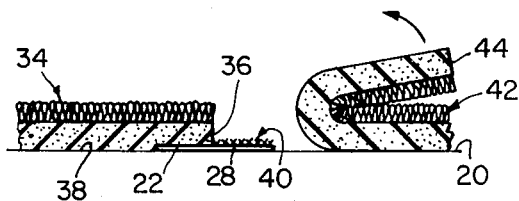
Figure 3:
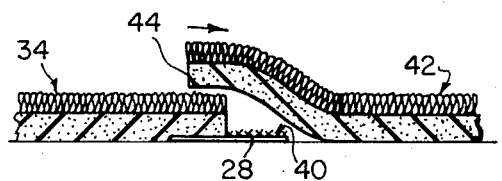
Figure 4:
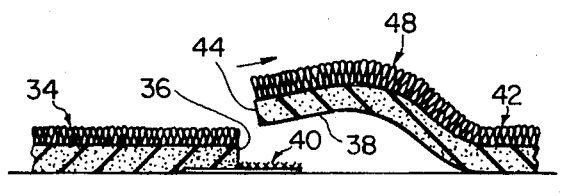
Figure 5:
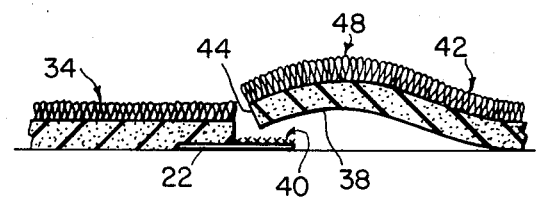
Figure 6:
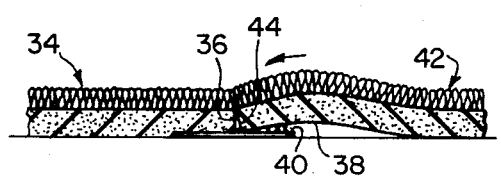
Figure 7:
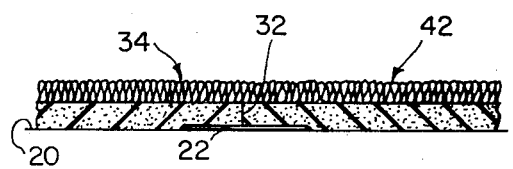

Further objects and advantages will appear in the specification hereinbelow. The objects of the invention are accomplished by the method and construction illustrated in the accompanying drawings in which:

FIG. 1 is an exploded sectional view of a seam made in accordance with the invention, somewhat enlarged in the thickness of the components with relation to the rest of the figures, and showing in phantom a protective cover for the adhesive and, by means of X marks, the positioning of the solvent of the invention, it being understood that the protective cover in phantom and the X marks indicating the solvent will not be found in the completed seam;

FIG. 2 is an end elevation;
FIG. 3 is an end elevation;
FIG. 4 is an end elevation;
FIG. 5 is an end elevation;
FIG. 6 is an end elevation; and
FIG. 7 is an end elevation.

Similar numerals refer to similar parts throughout the several views.

The method of the invention contemplates preparing a seam for work pieces which are to be held together in edge abutment to a holding surface. The holding surface could be a floor or a wall or a ceiling, and in illustrating the preferred embodiment of this invention, a floor 20 is used, it being understood that the same type of construction can be used with either a wall or a ceiling or any other type of suitable construction as a holding surface 20.

The method contemplates the preparation of a tape 22 having a face surface 24 and a reverse surface 26. In the preferred form of the invention, a layer of adhesive 28 is placed on the face surface 24 of the tape 22 and another layer or coating of adhesive 30 is placed on the reverse surface 26 of the tape 22. Such a tape 22 containing the adhesive 28 and 30 may be prepared in advance and stored in any manner known to the art. For example, the usual type of double faced adhesive tape may be obtained or prepared in advance in rolls with protective covers over the adhesive; or strips of adhesive tape in pre-determined lengths can be prepared with covers 16 and 18 for the face and reverse surfaces which can be removed immediately prior to the steps of applying the tape as set forth herein.

A tape 22 prepared in accordance with this specification is placed on a holding surface such as a floor 20 along the area over which the seam is to be created. Then a first work piece 34 is aligned with an edge 36 of the said work piece running medially along the width of the tape as shown in FIG. 1 of the drawings. The work piece 34 will adhere at its undersurface 38 to the adhesive portion 28. At this point, a quantity of means to reduce tackiness is poured or placed on the surface of adhesive portion 28 which is not covered by work piece 34. This is indicated in FIG. 2 of the drawings by the arrow headed lead lines with reference numeral 40. It is to be understood that the uncovered area of adhesive 28, in general, is preferably treated liberally with means to reduce tackiness 40 in the preferred form of the invention.

In the preferred form of the invention, a pressure sensitive adhesive is used for adhesive portion 28. This adhesive may be of a conventional type, generally comprising a tackifier resin and elastomer binder. The tackifier resin makes the adhesive tacky. The binder provides cohesive or internal strength to the adhesive.

Examples of binders include polyisoprene, neoprene, butadiene-acrylonitrile rubber, polyvinyl acetate, 2-ethyl hexyl acrylate, polyvinyl ether, polyisobutylene. Examples of tackifier resins include rosin esters (such as methyl, glycerol, and pentaerythritol esters of wood rosin), hydrogenated wood rosin and rosin esters and polymerized petroleum hydrocarbon resins.

The means 40 for rendering the pressure sensitive adhesive untacky is a solvent capable of dissolving at least the binder used in adhesive 28. The choice of solvent will depend upon the adhesive used. This choice is a matter well within the ordinary skill of a chemist in the art, and is readily available in the literature. For example, solvents for polyisoprene include toluene and hexane. A solvent for neoprene and nitrile rubber is methyl ethyl ketone. Solvents for polyvinyl acetate and 2-ethyl hexyl acrylate include alcohol and the other solvents mentioned above.

Solvent 40 is applied in a quantity so as to at least make slippery the upper surface of the adhesive. It may be applied by pouring, swabbing, spraying or by any other conventional means.

In a preferred form of the invention, an adhesive is chosen including a binder which is soluble in alcohol. An alcohol solvent is desirable because vinyl, of the type used in vinyl asbestos tile, is not attacked by alcohol. This will permit an installation of a covering material such as a carpet over a vinyl tile base without destroying the tile, it being understood that the type of seam and installation as described herein is readily removable without destroying the covered surface. Thus, a carpet covering can be fixed to a floor in accordance with this invention without the use of tacks or a permanent adhesive.

We have also found that an isopropyl alcohol is preferred for the solvent, or means 40 for rendering the adhesive untacky or less tacky temporarily. Isopropyl alcohol is preferred because the temporary slideability over the adhesive by rendering it untacky is prolonged. In other words, we have a delayed reaction which permits the installer more time to adjust the matching of the seam in accordance with the invention when isopropyl alcohol is used. Thus, by applying the solvent 40 to the uncovered adhesive portion 28, the adhesive will be rendered untacky or less tacky temporarily, usually long enough for a work piece such as the second work piece 42, having a second edge 44, to be placed in edge abutting relationship to edge 36 of the first work piece 34. This next step of placing the second work piece 42 is accomplished immediately after the application of the means to reduce tackiness indicated at reference numeral 40.

It is to be noted in FIG. 2 of the drawings that the first work piece 34 has already been placed in position on the tape 22 and the second work piece 42 has been placed on the floor and aligned with reference to the first work piece 34. It is in folded back position in which position it has been during the step of laying the first work piece 34. Now the operator grasps the edge 44 of the second work piece 42 and moves it in the direction of the arrows shown in FIG. 2 of the drawings until it is in position as shown in FIG. 3. The X marks designated by reference numeral 40 in FIG. 3 of the drawings indicates the presence of the solvent as described hereinabove over the uncovered adhesive portion, rendering it less tacky so that the operator can adjust the positioning of the second work piece 42 over the adhesive without undue interference. The operator now grasps edge 44 and moves it toward the seam line 32. As the operator does this and pushes edge 44 in the direction indicated by the arrow in FIG. 3, a bight 48 will appear as shown in FIG. 4 of the drawings. The operator then moves edge 44 down over the portion of tape treated by solvent 40 as shown in FIG. 5 of the drawings, and then pulls the edge 44 back in the direction of arrow as shown in FIG. 6 of the drawings.

During the steps comprised in FIGS. 5 and 6 of the drawings, the bight 48 will form a back pressure pushing edge 44 toward the seam 32 placing edge 44 in abutment with edge 36. The operator then presses bight 48 completely out of work piece 42 so that the completed seam 32 will have the appearance as shown in FIG. 7 of the drawings. The seam is then permitted to remain in the position of FIG. 7 until the action of the solvent 40 has worn off and work piece 42 adheres to the adhesive 24 of tape 22.

The bight 48 will usually be in the form of a bend or curve as shown in the drawings; sometimes in the form of a ripple depending on the type of material used for the work piece. When carpeting is used, it is usually a flexible material, and depending on the type of carpeting, will form either a bend or a series of ripples at the point generally designated by reference numeral 48. Thus, the method as described makes use of the operator as well as the compression bend or ripple effect in order to form the best possible seam 32 between edges 44 and 36.

Reference to FIG. 7 of the drawings shows the completed seam. Work piece 42 has been shifted or placed in its proper position and has been permitted to remain in the proper position until the means for rendering the adhesive untacky or less tacky has evaporated or ceased its temporary action, and both work pieces 34 and 42 are now adhered to the tape 22 and the holding surface such as the floor 20 in a position where they are in edge 36 and 44 abutment as well as in edge 50 and 52 alignment. This is further illustrated in FIG. 1 of the drawings in the exploded enlarged cross section showing the relationship of the various components of the seam construction. FIG. 1, in addition to being somewhat enlarged, may not be in exact proportional relationship as the thickness of the tape and adhesive are shown somewhat distorted to illustrate the invention better. It is to be noted, however, that adhesive portion 28 is shown relatively thicker than adhesive portion 30. This is done because it has been found that the process of the invention is easier to carry out when the adhesive such as adhesive portion 24 is relatively thicker than that used normally in the manufacture of such an adhesive tape 22.

In FIG. 1 of the drawings, temporary protective covers 16 and 18 for the adhesive are shown in phantom. It is to be understood that cover 18 is removed prior to fixing the tape 22 to a holding surface such as a floor 20. It is to be further understood that the protective cover 16 may be left on the tape during the steps of the process while the work pieces are being laid out and measured so as to permit movement over the floor 20 without interfering with the adhesive. However, both of the protective covers 16 and 18 will not appear in the finished seam as shown in FIG. 7 of the drawings.

Also in FIG. 1 of the drawings, reference numeral 40 indicates the temporary presence of the solvent, it being understood that the placing and action of the solvent 40 would occur immediately prior to the step of placing the second work piece 42 and, being temporary in character, would disappear or be rendered non-effective after the placement of work piece 42. In FIG. 1 it is also shown that work pieces 34 and 42 are comprised of a sponge base 60 and a pile finish 62, showing these work pieces as pieces of carpeting.

It is to be further understood that the adhesive portion 30 may be eliminated without departing from the scope of the invention, especially when the seam is to be over a floor where adherence to the floor is not required.

In the preferred embodiment described, we have mentioned a copolymer type pressure sensitive adhesive having alcohol, and in particular isopropyl alcohol, as a solvent. It is to be understood that various types of adhesives could be used with the method and to prepare the product of the invention, and that for each such adhesive there would be one or more specific solvents to render it less tacky for the purposes of the invention. It is to be understood, therefore, that the invention contemplates adhesives other than copolymer type pressure sensitive adhesives and solvents other than alcohol or isopropyl alcohol, these specific ingredients being described herein as being in the preferred embodiment of the invention.

It is also contemplated by the invention that a great number of work pieces can be seamed together in the manner illustrated, and that a bead or application of adhesive can be made between edges such as edges 36 and 44 to secure the work pieces together at a seam such as seam 32 in addition to all of the other steps previously described. It is preferred to make this application of adhesive at least near the pile 62 in making the seam. The step of applying the adhesive at seam 32 can be accomplished at any time during the method convenient to the operator.

Wherefore the method and the product of this invention has been described.

Wherefore we claim:

1. A method for joining at least one work piece to a surface covered by adhesive, comprising the steps of coating a surface with adhesive; then applying means to temporarily reduce tackiness to at least a portion of the adhesive on the surface; then placing the work piece on the temporarily untacky adhesive portion until in desired position; and then permitting said work piece to remain in said position on said adhesive surface until the effect of the means to temporarily reduce tackiness has worn off, allowing the adhesive to grip and hold the said work piece.

2. The method as defined in claim 1, in which the step of coating the surface with adhesive comprises coating the surface with a pressure sensitive adhesive, and in which the step of applying means to temporarily reduce tackiness comprises the step of applying alcohol.

3. The method as defined in claim 2, in which the step of applying alcohol contemplates the application of isopropyl alcohol.

4. A method for providing a seam between two work pieces, or the like, to be held in edge abutment comprising the steps of preparing a tape having face and reverse surfaces with a coating of adhesive; then placing the edge of a first work piece over at least a portion of the adhesive on said tape so that the work piece may adhere to the tape with said edge perpendicular to the tape; then applying means to temporarily reduce tackiness to at least a portion of the adhesive on the tape not covered by the first work piece; then placing a second work piece having an edge along the temporarily untacky adhesive on the tape until said first mentioned edge and said second mentioned edge are in edge abutment relationship, and then permitting said second work piece to remain in said position on said tape until the effect of the means to temporarily reduce tackiness has worn off, so that the adhesive will grip and hold the said second work piece together with the first mentioned work piece in such edge abutting relationship.

5. The method as recited in claim 4 which includes the further step of applying an adhesive on the reverse surface of the tape in addition to the first mentioned adhesive on the face surface of the tape and placing the reverse surface of the tape against a holding surface.

6. The method as recited in claim 4, in which the adhesive applied is a pressure sensitive adhesive, and the means used to temporarily reduce tackiness is alcohol.

7. The method as defined in claim 6, in which the means used to temporarily reduce tackiness is isopropyl alcohol.

8. The method as recited in claim 4, in which the adhesive applied is a pressure sensitive adhesive, and the means used to temporarily reduce tackiness is means having properties similar to isopropyl alcohol.

9. The method as defined in claim 6 which includes the further step of applying a pressure sensitive adhesive on the reverse surface of the tape and placing the reverse surface of the tape against a holding surface.

10. The method as defined in claim 5 which comprises the further steps of placing the edge of the second work piece overlying the edge of the first work piece and then pushing the edge of the second work piece back to form a compression bight before placing the second work piece along the temporarily untacky adhesive.

11. The method as defined in claim 9 which comprises the further steps of smoothing out the bight in the second work piece after the edges of the first and second work pieces have been placed in edge abutment relationship.

12. A method for laying a plurality of pieces of carpeting, or the like, comprising a first piece and a second piece on a construction surface by means of double faced adhesive tape means: comprising the steps of coating a tape having first and second faces with adhesive on both faces; placing the first tape face against said construction surface; placing the edge of the first piece of carpeting, or the like, over a portion of the adhesive on the second face of said tape so that the first piece may adhere to the tape with said edge perpendicular to the second tape face; then applying means to temporarily reduce tackiness to at least a portion of the adhesive on the second tape face on the piece; then placing an edge of the second piece along the temporarily untacky adhesive on the second face of the tape until said first mentioned edge and said second mentioned edge are in edge abutment relationship, and then permitting said second piece of carpeting, or the like, to remain in said position on said tape until the effect of the means to temporarily reduce tackiness has worn off, so that the adhesive will grip and hold the said second work piece together with the first mentioned work piece in such edge abutting relationship.

13. The method as defined in claim 12 which comprises the further steps of placing the edge of the second piece of carpeting, or the like, overlying the edge of the first piece of carpeting, or the like, and then pushing the edge of the second piece back to form a compression bight before placing the second piece along the temporarily untacky adhesive.

14. The method as defined in claim 13 which comprises the further steps of smoothing out the bight in the second piece of carpeting, or the like, after the edges of the first and second pieces have been placed in edge abutment relationship.

References Cited

UNITED STATES PATENTS

| 3,027,271 | 3/1962 | Plasse et al. | 117—68.5 X |
| 2,731,378 | 1/1956 | Strachaw | 156—289 X |
| 3,087,850 | 4/1963 | Cole | 156—230 X |
| 3,503,782 | 3/1970 | Ayres | 156—289 X |
| 2,700,629 | 1/1955 | Townsend | 156—236 |
| 2,956,703 | 10/1960 | Royal | 156—304 X |

LELAND A. SEBASTIAN, Primary Examiner

R. E. SCHAFER, Assistant Examiner

U.S. Cl. X.R.

156—289, 299, 304